J. K. COLLINS.
HAY TEDDER.
No. 95,656. Patented Oct. 12, 1869.
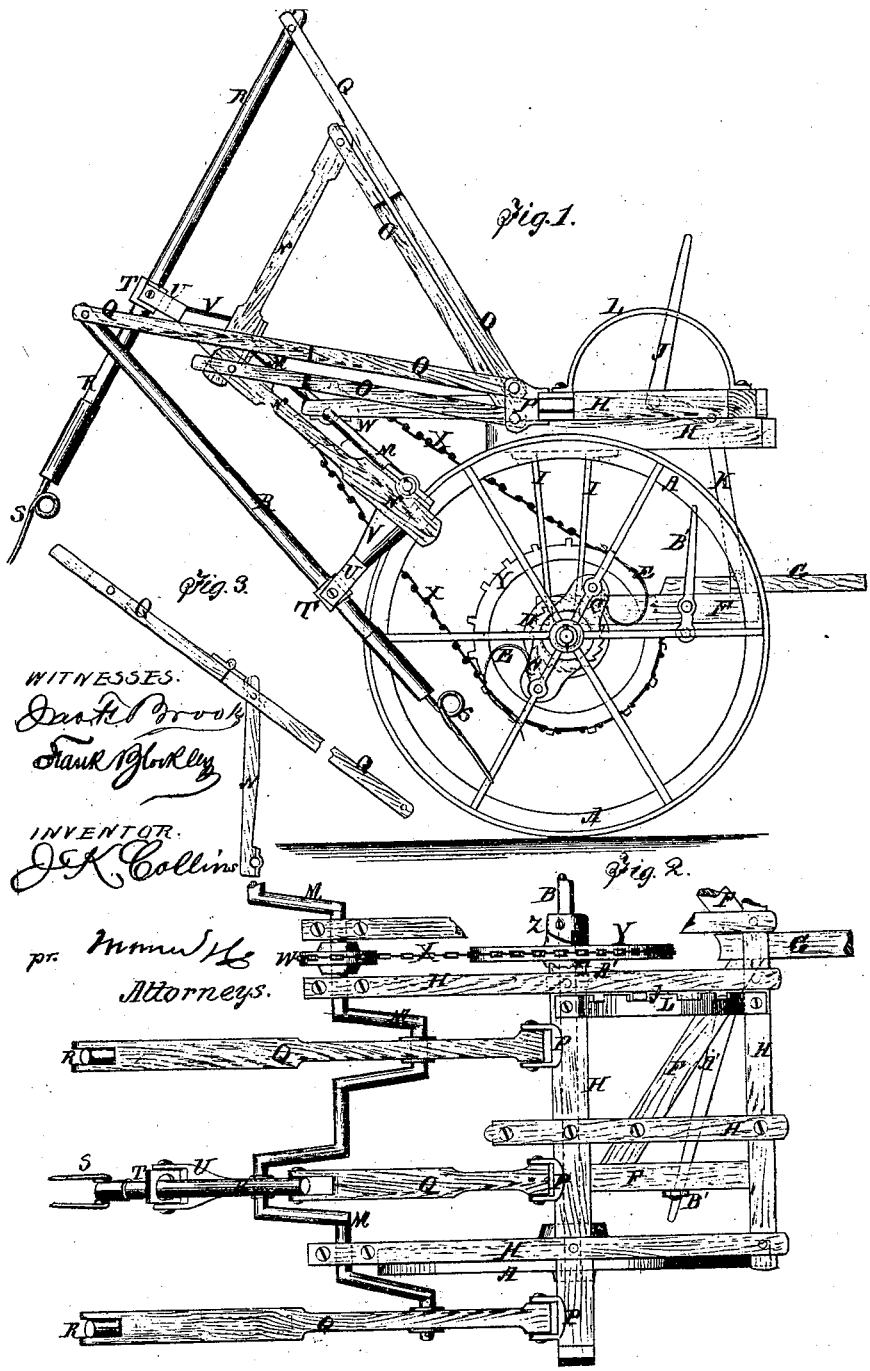

United States Patent Office.

J. K. COLLINS, OF HARTFORD, VERMONT.

*Letters Patent No. 95,656, dated October 12, 1869.*

IMPROVEMENT IN HAY-TEDDERS.

The Schedule referred to in these Letters Patent and making part of the same

*To all whom it may concern:*

Be it known that I, J. K. COLLINS, of Hartford, in the county of Windsor, and State of Vermont, have invented a new and useful Improvement in Hay-Tedder; and I do hereby declare that the following is a full, clear, and exact description thereof, which will enable others skilled in the art to make and use the same, reference being had to the accompanying drawings, forming part of this specification, in which—

Figure 1 is a side view of my improved machine.

Figure 2 is a top view of the same, parts being broken away to show the construction.

Figure 3 is a detail view of a modification of the connection-arms.

Similar letters of reference indicate corresponding parts.

My invention has for its object to furnish a simple and convenient machine for tedding hay, which shall be so constructed and arranged as to operate the tedding-forks with a movement similar to the movement of the fork when the hay is being tedded by hand; and It consists in the construction and combination of the various parts of the machine, as hereinafter more fully described.

A are the wheels which revolve upon the journals of the axle B, and are made to carry the said axle with them in their revolution, as they move forward by the pawls C, pivoted to the said wheels A, and which take hold of the teeth of the ratchet-wheels D, attached to the said axle B.

The pawls C are held in contact with the ratchet-wheels D by the springs E, attached to the said wheels A.

F is the frame or platform to which the tongue G is attached, and to the rear part of which are attached bearings, in which the axle B revolves, so that the said frame F may ride upon and be supported by the said axle.

H is the upper frame or platform, with which the operating-mechanism of tedder is connected, and which is attached to the upper ends of the standards or frames I, in the lower ends of which are formed bearings, in which the axle B revolves, so that the said frame H and its attachments may be supported by the said axle.

J is a bent lever, which is pivoted at its angle to the frame H, and to the end of the lower or short arm of which is pivoted the upper end of the connecting-bar K, the lower end of which is pivoted to the frame F.

The upper or long arm of the lever J extends up along the side of the curved rack or notched catch-bar L, so that by adjusting the position of the said lever L, the frame H may be held parallel with the frame F, or inclined or tilted forward or rearward, as may be desired.

To the rearwardly-projecting ends of the longitudinal bars of the frame H are attached bearings, in which revolves the shaft M, upon the opposite sides of which are formed two sets of cranks, as shown in fig. 2.

To the cranks of the shaft M are pivoted the lower ends of the arms N, the upper ends of which are pivoted to the upper ends of the arms O, the lower ends of which are pivoted to brackets P, attached to the central cross-bar of the frame H.

Q are arms, the lower ends of which are pivoted to the same brackets P, with the arms O.

The arms Q extend out just above and parallel with the arms O, are made longer than said arms O, and to their outer or upper ends are pivoted the upper ends of the fork-handles R.

To the lower ends of the handles R are attached the forks S, the tines of which I prefer to make with a coil, as shown in figs. 1 and 2, to give them elasticity, so that, should they strike an obstruction, they may "give," instead of being broken.

The fork-handles R are guided, supported, and held in proper position by the rings T, through which they pass, and which are pivoted at their opposite sides to the arms of the swivelled brackets U, which are swivelled to the standards V, attached to the lower ends of the arms N, as shown in fig. 1.

W is a small spur-wheel attached to the middle part of the crank-shaft M, so as to carry the said crank-shaft with it in its revolution, and thus impart motion to the tedder-forks.

X is an endless chain, which passes around the spur-wheel W, and around the spur-wheel Y, and the links of which are so formed as to fit upon the spurs or teeth of the wheels W and Y.

The spur-wheel Y revolves upon the middle part of the axle B, and has a clutch formed upon one end of its hub, into which catches the clutch Z that is attached to the said axle B, so that the axle B may be made to carry the spur-wheel Y with it in its revolution when desired, and thus operate the tedder-forks.

A' is a bent lever, the forked end of which rides upon a groove formed around the end of the hub of the spur-wheel Y.

The lever A' is pivoted at its angle to the frame F, and to its other end is pivoted the lower end of the lever B', which is pivoted to the said frame F, and the upper end of which extends up into such a position that it may be conveniently reached and operated by the driver.

If desired, the arm O may be omitted, and the upper end of the arm N pivoted to the arm Q; but, in this case, the said arm Q should be hinged or jointed just above the point at which the arm N is pivoted to it, to give the requisite play to the tedder-forks.

Having thus described my invention,

I claim as new, and desire to secure by Letters Patent—

1. The combination of the crank-shaft, arms, forks, fork-handles, pivoted rings, swivelled brackets, and tilting-frame, all operating together in the manner described.

2. The combination of the bent lever J, connecting-bar K, and curved rack or catch-bar L, with the frame F and tilting-frame H, substantially as herein shown and described, and for the purpose set forth.

3. The combination of the lever B' and bent lever A', with the spur-wheel Y and frame F, substantially as herein shown and described, and for the purpose set forth.

J. K. COLLINS

Witnesses:
SAML. E. RINGREE,
BENJAMIN DUTTON